3,842,148
METHOD OF MAKING AN INTEGRAL MAGNETIC ROTOR AND GEAR
Robert J. Loubier, 1811 N. Glendale,
Fort Wayne, Ind. 46804
Filed Apr. 14, 1972, Ser. No. 244,130
Int. Cl. B06b 1/02; B29f 1/00
U.S. Cl. 264—24    5 Claims

ABSTRACT OF THE DISCLOSURE

In making an integral gear and rotor assembly for a dynamoelectric machine, the gear and rotor are injection molded as a unit from thermoplastic powder and a magnetizable powder such as barium ferrite mixed in suitable proportions to give desired magnetic and physical strength to the finished product. Before the molded article solidifies, the rotor portion of the mold is subject to magnetic fields to orient the magnetic particles so as to produce alternate North-South poles around the periphery of the rotor.

BACKGROUND OF THE INVENTION

Electric synchronous timing motors conventionally employ a rotor assembly which comprises an annular, permanently magnetized rotor, and a combination shaft and gear physically connected thereto. The annular rotor is fabricated conventionally of ceramic-magnetic materials while the shaft and gear parts are of thermoplastic material molded thereabout. Such two-piece design may also include a magnet of ceramic powder and binder, wherein the binder is of minimal percentage, providing a suitable magnet but having little or no physical strength. The necessary structural strength is provided by the plastic material molded thereabout.

Such a two-part assembly is relatively expensive to fabricate because of the different processing steps involved. Furthermore, in molding a plastic part to the ceramic magnet, breakage due to the frangibility of the magnet may occur. Since such ceramic magnets are indeed delicate and fragile, they must be handled with extreme care before and during the molding operation.

In such prior art assembly, the ceramic magnet provides the magnetic structure of the rotor whereas the plastic provides the physical or structural strength therefor whereby motive force may be transmitted to or from the magnet. Since the material of which the magnet is fabricated is fragile, it is not suitable for use as the functioning gear or shaft parts of the assembly, the plastic material providing the structural strength. Furthermore, even if the ceramic part were strong enough, the material thereof cannot be molded to precise enough tolerances for the complexity of the particular rotor design.

SUMMARY OF THE INVENTION

The present invention relates to an improvement in rotor assemblies for electrodynamic machines, and more particularly to an integrated rotor assembly composed of a permanently magnetized rotor and functional machine parts that are conventionally secured thereto.

In accordance with this invention, there is provided for use in a dynamoelectric machine, an integral rotor assembly comprising a permanently magnetized rotor and a force-transmitting element, such as a spur gear, formed of the same material. The material includes a solidified mixture of thermoplastic material and magnetic particles which are capable of being permanently magnetized. Barium ferrite is a typical magnetic material. These magnetic particles in the rotor are magnetically oriented according to a predetermined geometric pattern. The thermoplastic serves as a holding matrix for the magnetic particles and also provides structural strength for the assembly. The particles are homogeneously distributed throughout the assembly except as modified by the aforesaid orientation. The quantity of said particles in the assembly are sufficient to provide the rotor with a predetermined magnetic strength with the particles oriented as aforesaid, and the quantity of the thermoplastic in the assembly is sufficient to provide the predetermined structural strength for the assembly and in particular for the transmission of motive force to or from the rotor.

In the event the force-transmitting element is a spur gear, it is obvious that the gear must be strong enough to transmit motive force.

It is an object of this invention to provide a rotor assembly for a dynamoelectric machine in which two or more functioning parts, combined in an integrated assembly, are formed of the same material, at least one of these parts requiring a predetermined structural strength and the other a predetermined magnetic strength.

It is another object of this invention to provide a method and apparatus for fabricating this rotor assembly.

It is still another object of this invention to provide a rotor assembly which is simple in construction, economical to manufacture, and efficient in operation.

The above-mentioned and other features and objects of this invention and the manner of attaining them will become more apparent and the invention itself will be best understood by reference to the following description of an embodiment of the invention taken in conjunction with the accompanying drawings.

Figure 1:
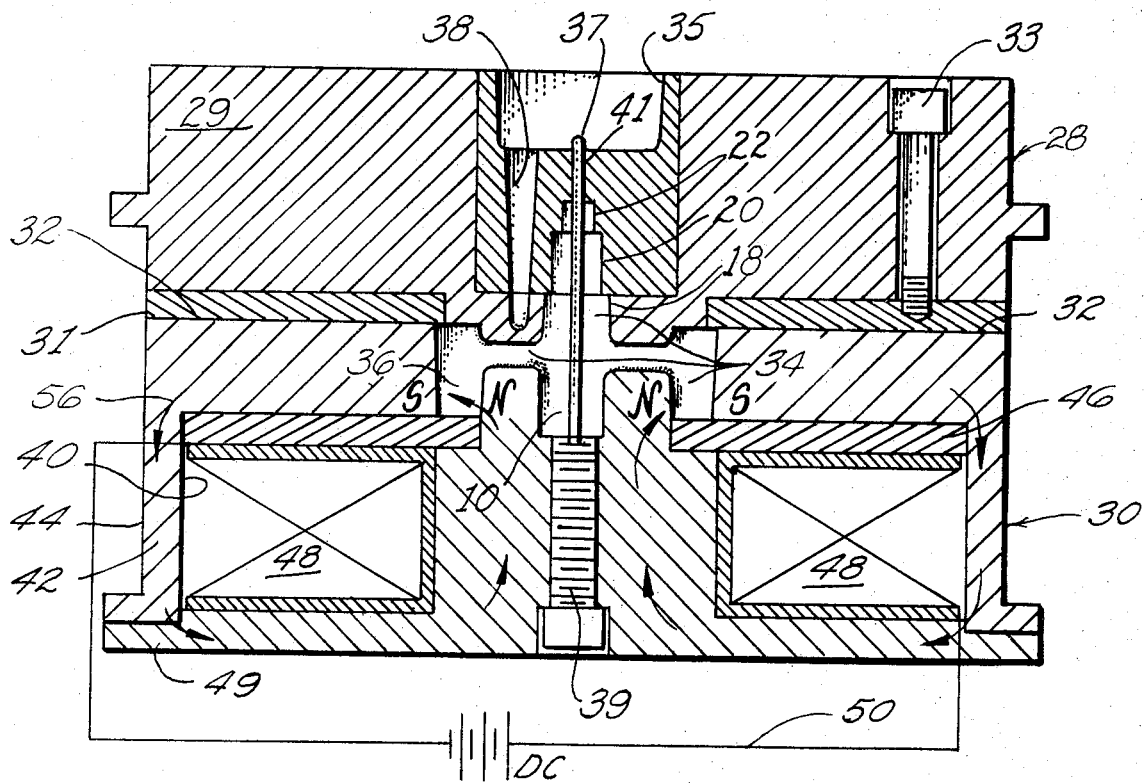
FIG. 1 is a cross-section of a typical mold apparatus used in connection with fabricating a rotor assembly of this invention.
Figure 2:
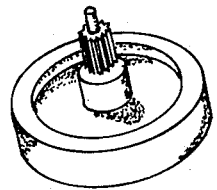
FIG. 2 is a perspective view of a typical rotor assembly of this invention.
Figure 5:
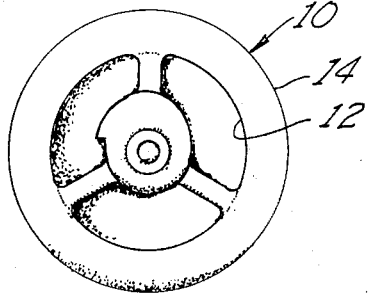
FIGS. 3, 4, and 5 are respectively, side, front, and rear views of the rotor assembly of FIG. 2.
Figure 4:
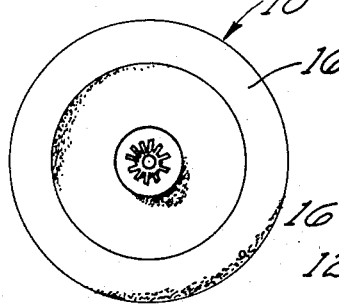
Figure 3:
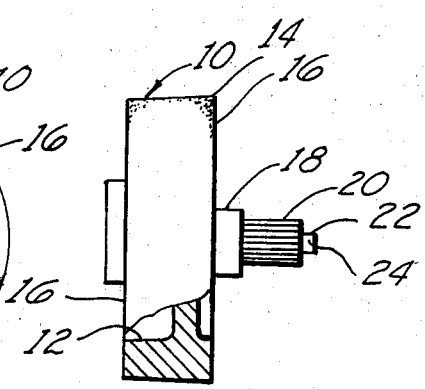

Referring to the drawings, and more particularly to FIGS. 2 through 5, a typical rotor assembly of this invention for use in a conventional electric, synchronous-timing motor is shown. This assembly includes as parts of the rotor assembly the permanently magnetized, annular rotor 10 of cylindrical shape defined by inner and outer coaxial peripheral surfaces 12 and 14, respectively, as shown. As an integral part of the rotor 10 is a disc-shaped support 16 provided with a central hub 18, a spur gear 20 and a shaft portion 22. All these parts are integrally molded together in a single unit or assembly, a shaft opening being provided therethrough for receiving a supporting axle about which the rotor assembly just described rotates.

The assembly as a whole has the necessary physical strength to function properly in a synchronous-timing motor. Furthermore, it has the necessary magnetic strength to function efficiently as a conventional rotor.

This rotor assembly is fabricated preferably by injection molding a mixture of essentially two ingredients, one a thermoplastic material and the other magnetic particles of the type which may be permanently magnetized, these typically being either isotropic or anisotropic. Typical of the thermoplastic material is polyamide, known in the trade as Nylon, a trademark of E. I. duPont de Nemours Corp.

Typical of the magnetic material is barium ferrite in particle sizes conventionally available. Typical size of such particles may be one to ten microns or coarser.

Other plastics and materials for magnetic particles may be used without departing from the spirit and scope of this invention provided the necessary strength and functional properties as will become apparent from the following description are present.

The rotor assembly of FIGS. 2 through 5 has an additional part integrally molded therewith in the form of a cam 26 spaced inwardly from the inner rotor surface 12. While these particular rotor parts have been disclosed, it will become apparent that other functional parts may be used instead without departing from the spirit and scope of this invention.

Now referring to FIG. 1, the method and apparatus of this invention will be described. The rotor assembly is fabricated as a single unit preferably by injection molding. The principal parts of the apparatus employed in this injection molding process is a mold essentially in two sections, these being an upper mold member 28 and a lower mold member 30. Both of these mold members 28 and 30 have parting surfaces 32 which are flat and intimately engageable, these surfaces being interrupted only by the mold cavity indicated generally by the numeral 34. One surface of the disc portion 16 of the rotor is flush with the parting surfaces 32 as shown. The axis of the rotor assembly is positioned normal to the parting surfaces 32, the cylindrical rotor portion 36 of the cavity which forms the rotor part 10 previously described, extending downwardly into the lower mold member 30 as shown. The remaining parts of the cavity which form the hub 18, the spur gear 20 and the shaft part 22, are in the upper mold member 28 as shown. A gate 38 in the mold member 28 communicates with the cavity 34.

The upper mold member 28 is generally in three parts, a non-magnetic body 29, an annular plate 31 of magnetic material suitably bolted thereto by means of a series of bolts 33, and an insert 35 preferably of a durable material such as steel. The insert 35 preferably is press-fitted into a companion cavity in the body 29. In one embodiment, the body 29 is of soft stainless steel while the annular plate 31 is steel. The plate 31 provides a portion of the parting surface of the upper mold member 28.

In the insert 35 is the upper portion of the gate 38 and the cavity parts which form the hub 18, the spur gear 20, and the shaft part 22. As will appear from the description that follows, the body 29 is formed of a non-magnetic material so as to provide a substantial or high reluctance path to the flow of magnetic flux, while the plate 31 is of magnetic material to provide a low reluctance path. Also, the plate 31 is preferably hardened so as to provide a durable parting surface for the upper mold member 28. Similarly, the insert 35 is formed of steel so as to provide greater wear life as compared with the softer stainless steel shank 39 threaded into the lower mold member 30 as shown.

In the lower mold member 30 is an annular cavity 40 concentric with the rotor cavity 36 formed by two mold parts, 42 and 44 suitably secured together by means of bolts (not shown) or clamping plates in a conventional molding machine. The annular cavity 40 has intimately fitted thereinto a coil or solenoid 48 having electrical leads 50. A thin non-magnetic metal disc 46 (stainless steel or the like) separates the bottom of the rotor cavity 36 from the upper surface of the soldenoid 48 as shown. All remaining parts of the lower mold member 30 are formed of magnetic material, such as steel, the solenoid 48 in effect being imbedded in a solid steel block represented by the lower mold member 30.

The shank 39 of core pin 37 is fixedly threaded to the mold part 44 as shown such that the pin 37 is positioned coaxially with respect to the cavity 34 to be slidably received by more 41 in insert 35.

The material which is used in forming the rotor assembly in one embodiment of this invention is a mixture of a suitable thermoplastic material, such as polyamide (Nylon), and anisotropic particles of barium ferrite as previously explained. The percentage of these materials in one workable embodiment is 20% thermoplastic and 80% magnetic particles. This material thoroughly mixed in powdered form is then fed into a conventional injection molding machine. If desired, such powdered material may be extruded and pelletized prior to such injection molding. The mold apparatus of FIG. 1 is mounted in such a machine and the material is injected through the gate 38 into the cavity 36 with the mold halves 28 and 30 closed as shown. While the material is molten in the cavity 34, a suitable DC voltage is applied to the leads 50 to energize the coil 48. A magnetic field is thereby produced which produces unidirectional flux lines in the mold member 30 as indicated by the arrows 56, which pass with maximum density radially through the rotor cavity 36, via the magnetic plate 31 and mold parts 42 and 44, as shown. This results, in effect, in providing annular magnetic poles radially spaced apart on opposite sides of the rotor cavity 36 as indicated by the letters "N" and "S," conventional symbols for North and South magnetic poles. While the plastic is yet molten, this magnetic field orients the magnetic particles in their preferred direction of magnetization. The plastic is permitted to cool and solidify whereupon the mold halves 28 and 30 are separated in a conventional manner to eject the molded part therefrom. Prior to the solidification or shortly thereafter of the plastic, the power applied to the coil 48 may be removed.

By forming the mold 29 of non-magnetic material, the heavier flux density will pass through the magnetic material on opposite radial sides of the ring cavity 36, and further, the magnetic field will be shunted away from the hub and gear portions of the cavity which need not be magnetized. Not magnetized, the gear portion 20 of the integral rotor assembly will not pick up magnetic particles which could, if present, interfere with the meshing of gear portion 20 and another gear (not shown) in a synchronous-timing motor in which the rotor assembly is mounted.

In the finished product, by reason of the particles in the rotor portion 10 being magnetically oriented, the rotor may be permanently magnetized according to a predetermined magnetic field pattern, and will possess the required magnetic strength to function properly and efficiently in a conventional synchronous-timing motor. By the same token, a sufficient quantity of thermoplastic is employed in the assembly to serve as a holding matrix and also to impart structural strength whereby the functioning parts 18, 20 and 22 are sufficiently strong to transmit the usual mechanical forces.

The quantities of plastic and magnetic particles used must be balanced one against the other in order to obtain the necessary magnetic and physical strengths as described. By using too little plastic, the finished assembly will have insufficient physical strength to perform the necessary mechanical functions. By the same token, an inadequate quantity of magnetic material will result in magnetic strength properties too small to serve the intended purpose. By utilizing either isotropic or anisotropic magnetic materials, it is possible to maximize the physical and magnetic strength properties whereby an efficient strong rotor assembly may be provided.

Merely utilizing the magnetic and plastic materials as described and injection molding without the application of the magnetic, orienting field will not produce the desired result. In order to maximize the quantity of plastic used, hence physical strength considered, it is necessary that the magnetic materials be of a class which possesses improved magnetic properties when oriented by a magnetic field. Anisotropic materials naturally possess these properties and isotropic materials when comminuted respond favorably to a magnetizing field also to provide these properties. By orienting the permanently magnetizable particles in the rotor portion of the total assembly, it has been found that the quantity of the magnetic material may be held to a minimum thereby permitting use of sufficient plastic material for structural strength. The rotor assembly of this invention is an integral part containing at least two components, one providing the magnetic properties, the other the structural strength. Substantial economies are realized in the fact that injection molding is an economical, high-volume production process and the thermoplastic materials are economical. Since this integral assembly of functioning components is formed in a single operation, a quite obvious economic advantage is achieved over the prior art arrangement of fabricating the assembly in two steps, molding a structural support about the ceramic magnetic rotor previously fabricated in a separate operation.

If it is desired to provide alternate North and South poles around the circumference of the rotor 10, it is only necessary to magnetize the rotor in this manner using conventional techniques.

While barium ferrite as a preferred material has been disclosed, other anisotropic materials may be used. Rotors of sufficient but less magnetic strength may be fabricated in the same manner using isotropic magnetic particles instead. Such materials may be oriented by application of the magnetizing field as previously explained, but the magnetic strength in the finished rotor will not be as great with the isotropic as with the anisotropic materials. These magnetic materials are to be contrasted with ordinary iron filings or materials of like properties which are not considered to be suitable in this invention since the desired structural and magnetic strength properties in the minimum-sized assembly are not considered proper.

Plastic materials other than polyamides may be used depending upon the properties desired of the finished product. For example, the addition of a quantity of polytetrafluoroethylene (Teflon) provides lubricity and glass fibers strength. Thermosetting plastic materials may also be used, again depending upon design preferences or functional requirements of the rotor assembly.

While there have been described above the principles of this invention in connection with specific apparatus, it is to be clearly understood that this description is made only by way of example and not as a limitation to the scope of the invention.

What is claimed is:

1. The method of fabricating an integral rotor assembly for a dynamoelectric machine, said rotor assembly including a rotor and a force-transmitting element, said assembly being molded of a mixture of thermoplastic and permanently magnetizable particles, said rotor having a magnetized peripheral portion, said element being spaced radially inwardly from said peripheral portion and not being magnetized; comprising the steps of mixing predetermined quantities of thermoplastic and magnetizable particles, injection molding said assembly of said mixture, said molding step including the melting of said thermoplastic and permitting it to cool and thereby solidify, magnetically orienting said particles by passing flux lines radially through said peripheral portion during the period when said thermoplastic is molten, shunting the flux lines away from said force-transmitting element, and causing said thermoplastic to solidify thereby securing said particles in said peripheral portion in magnetically oriented position.

2. The method of claim 1 in which said orienting step is performed by applying selectively a magnetic field to said peripheral portion.

3. The method of claim 2 in which said force-transmitting element is a spur gear, a solid disc-like portion connecting said peripheral portion to said spur gear, said spur gear projecting axially beyond said peripheral portion, said peripheral portion being cylindrically shaped having inner and outer concentric peripheral surfaces, said magnetic field being applied to said cylindrical portion radially between said inner and outer surfaces, said magnetic field being shunted away from said gear by providing a high reluctance path between said gear and said peripheral portion.

4. The method of claim 2 wherein said orienting step further includes positioning a magnetic field-generating means adjacent to one side of said assembly and oriented with respect thereto to pass a magnetic field unidirectionally in a predetermined direction through said peripheral portion, placing magnetically permeable bodies contiguous to said peripheral portion and said field-generating means in a position to form a closed, magnetically permeable path, said path including said peripheral portion, and positioning a non-magnetic body contiguous to the other side of said assembly in a position substantially between said peripheral portion and said elements.

5. The method of claim 4 wherein said magnetically permeable bodies and said non-magnetic body are portions of a mold provided with a cavity for shaping said assembly.

References Cited

UNITED STATES PATENTS

| | | | |
|---|---|---|---|
| 3,564,705 | 2/1971 | Cochardt | 264—108 XR |
| 2,309,729 | 2/1943 | Gordon | 264—328 XR |
| 3,164,734 | 1/1965 | Heinzen | 310—156 |
| 3,691,130 | 9/1972 | Logvinenko | 264—24 XR |
| 2,900,344 | 8/1959 | Stuyts et al. | 335—302 XR |
| 3,051,988 | 9/1962 | Baermann | 425—174.8 |
| 3,246,060 | 4/1966 | Blume | 264—24 |
| 3,551,711 | 12/1970 | Davis | 310—43 |
| 3,708,177 | 1/1973 | Baermann | 264—24 |

ROBERT F. WHITE, Primary Examiner

W. E. HOAG, Assistant Examiner

U.S. Cl. X.R.

264—108, 328

UNITED STATES PATENT OFFICE
CERTIFICATE OF CORRECTION

Patent No. 3,842,148　　　　　　　　　　Dated　October 15, 1974

Inventor(s)　　Robert J. Loubier

It is certified that error appears in the above-identified patent and that said Letters Patent are hereby corrected as shown below:

IN THE SPECIFICATIONS

Col. 3, line 50, --for repeated engagements a core pin 37 having an enlarged-- should be inserted after "steel"
Col. 3, line 60, "soldenoid" should be --solenoid--
Col. 3, line 68, "more" should be --bore--
Col. 4, line 26, --body-- should be inserted after "mold"

Signed and sealed this 21st day of January 1975.

(SEAL)
Attest:

McCOY M. GIBSON JR.　　　　　　　　　C. MARSHALL DANN
Attesting Officer　　　　　　　　　　Commissioner of Patents